United States Patent [19]

Oikari

[11] Patent Number: 4,459,483
[45] Date of Patent: Jul. 10, 1984

[54] DEVICE FOR THE ELIMINATION OF DISTURBANCES CAUSED BY STATIC ELECTRICITY IN LIQUID SCINTILLATION COUNTING

[75] Inventor: Timo Oikari, Turku, Finland

[73] Assignee: Wallac Oy, Finland

[21] Appl. No.: 370,411

[22] Filed: Apr. 21, 1982

[30] Foreign Application Priority Data

May 15, 1981 [FI] Finland ................. 811511

[51] Int. Cl.³ ............................................. G01T 1/00
[52] U.S. Cl. .................................................. 250/328
[58] Field of Search ............... 250/328, 361 R, 363 R, 250/364, 488.1, 304

[56] References Cited

U.S. PATENT DOCUMENTS 3,610,929 10/1971 Fujimoto et al. ............... 250/488.1
4,001,584 1/1977 Mueller et al. .................. 250/328
4,052,614 10/1977 Fletcher et al. .................. 250/310

Primary Examiner—Davis L. Willis
Attorney, Agent, or Firm—Steinberg & Raskin

[57] ABSTRACT

Disturbances caused by static electricity in liquid scintillation counting are eliminated by an ionizing device. A liquid scintillation counter in a measurement chamber surrounded by a radiation protective device measures nuclear fissions occurring in a sample bottle moved into the measurement chamber along a predetermined path. The ionizing device ionizes the air by producing positive and negative ions in the path followed by the sample bottle into the measurement chamber. Ions produced by the ionizing device on the sample bottle before the bottle enters the chamber neutralize any electrostatic charge on the bottle.

5 Claims, 2 Drawing Figures

4,459,483

DEVICE FOR THE ELIMINATION OF DISTURBANCES CAUSED BY STATIC ELECTRICITY IN LIQUID SCINTILLATION COUNTING

BACKGROUND OF THE INVENTION

The present invention relates to a device for the elimination of disturbances caused by static electricity in liquid scintillation counting. In the liquid scintillation counting, a sample bottle is shifted into a measurement chamber inside a radiation protective device and nuclear fissions occurring in the sample bottle are measured by a liquid scintillation counter in the chamber.

The liquid scintillation counter measures the nuclear fissions occurring in the sample bottle, whose energy is liberated as $\alpha$-, $\beta$- or $\gamma$-radiation. In addition to the substance to be measured and a solvent, the sammple bottle contains a primary scintillator liquid, which converts the energy into the ultraviolet range, and a secondary scintillator liquid, which converts the energy into a discharge of a longer wavelength, near visible light.

Sample bottles charged with static electricity, as a result of rubbing, for example, are a common phenomenon disturbing liquid scintillation counting. A discharge of the produced electrostatic charges during the liquid scintillation counting may increase the background by several orders. Furthermore, the pulses obtained do not follow the law of random coincidence, so that the use of either mathematical monitoring or delayed coincidence is impossible.

A charge on the sample block may be eliminated by a separate treatment such as, for example, by washing or wiping the bottle with a piece of cloth moistened in spirit, or spraying an anti-static agent onto the sample bottle. However, these procedures constitute additional steps of treatment of the sample, so that their use is not desirable in practice.

Mechanical solutions in the measurement device such as, for example, the use of specific materials, the geometric configuration of the measurement chamber, etc, are difficult to optimize and are frequently insufficient.

SUMMARY OF THE INVENTION

The principal object of the invention is to provide a device for eliminating disturbances caused by static electricity in liquid scintillation counting, which device is an improvement over known devices and methods.

An object of the invention is to provide a device for eliminating disturbances caused by static electricity in liquid scintillation counting without additional steps of treatment of the sample bottle.

In accordance with the invention, a device which achieves the objects of the invention for the elimination of disturbances caused by static electricity in liquid scintillation counting, includes a liquid scintillation counter in a measurement chamber surrounded by a radiation protective device. The scintillation counter measures nuclear fissions occurring in a sample bottle moved into the measurement chamber along a predetermined path. The device comprising an ionizing device for ionizing the air by producing positive and negative ions in the path followed by the sample bottle into the measurement chamber whereby ions produced by the ionizing device on the sample bottle before the bottle enters the chamber neutralize any electrostatic charge on the bottle.

The ionizing device includes a metal tip at which the ions are produced.

The ionizing device further includes an AC transformer having a primary winding electrically connected to a source of alternating electrical energy and a secondary winding electrically coupled to the metal tip.

The ionizing device further includes a resistor electrically connected in series between the secondary winding and the tip.

The transformer is a step up transformer.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 1:
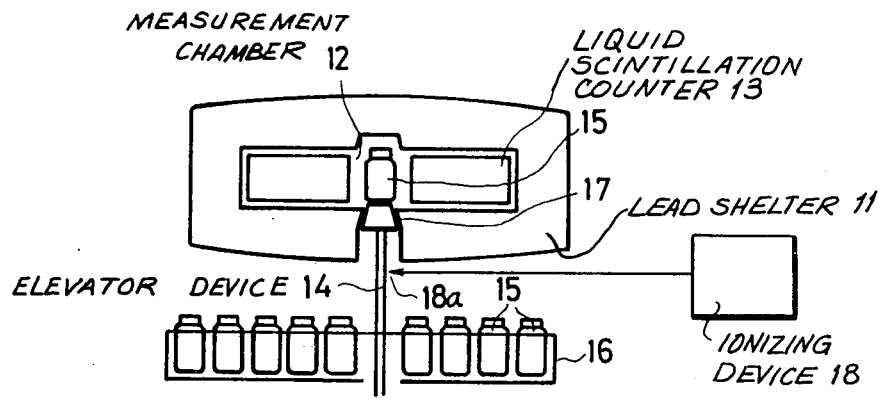
FIG. 1 is a block diagram of an embodiment of the device of the invention for the elimination of disturbances caused by static electricity in liquid scintillation counting.

In the liquid scintillation counting apparatus shown in FIG. 1, a sample bottle 15 is shifted by an elevator device 14 from a sample stand 16 into a measurement chamber 12. The measurement chamber 12 is surrounded by a radiation protective device such as, for example, a lead shelter 11. A liquid scintillation counter or photomultiplier tube 13 is provided in the measurement chamber 12. A rubber ring 17 operates as a photo-shutter.

According to the fundamental realization of the invention, the sample bottles 15 are moved along a predetermined path, determined by the elevator device 14, so that they bypass an ionizing device 18 before they enter the measurement chamber 12. The ionizing device 18 ionizes the air of the path at the sample bottle 15, whereby ions produced by said device on said bottle before it enters the chamber 12 neutralize any electrostatic charge on said bottle. The ionizing device 18 produces both positive and negative ions in the path followed by the sample bottle 15 into the measurement chamber 12, so that said device is capable of neutralizing both positively and negatively charged sample bottles 15.

Figure 2:
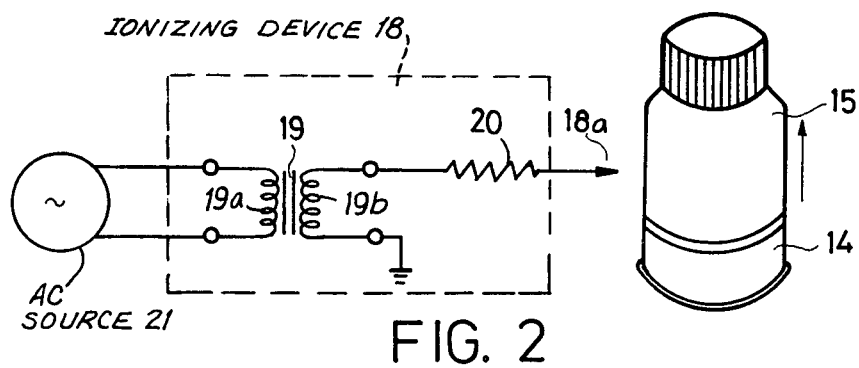
FIG. 2 is a circuit diagram of an embodiment of the ionizing device of the invention.

FIG. 2 shows a preferred embodiment of an ionizing device 18 for the production of positive and negative ions. In the ionizing device of FIG. 2, an AC step up transformer 19 produces an AC voltage of about 4 kV$_{rms}$ from an AC source 21. The transformer 19 has a primary winding 19a electrically connected to the source of alternating current 21 and a secondary winding 19b electrically connected to one or a group of metal tips 18a via a resistor 20, connected in series therebetween and having a resistance of 100 megohms. The air-ionizing voltage is provided at the tip or tips 18a. The resistor 20 functions to decrease the current of the tip or tips 18a to a safe level in the event of a short-circuit.

The ionizing device 18 is placed so that, on its way into the measurement chamber 12, the sample bottle 15 bypasses the tip or tips 18a at a close distance as it is moved by the elevator device 14. The ionizing device 18 may be automatically switched off, in order to eliminate possible corona discharge disturbances, when the counting commences.

The AC ionizing device 18 of FIG. 2 has the advantage of good efficiency. The background produced by sample bottles 15, even those having a strong initial charge, is less than 100 cpm when the AC ionizing device of the invention is utilized. Furthermore, the AC ionizing device of the invention permits the neutralization of both positively and negatively charged sample bottles 15.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A device for the elimination of disturbances caused by static electricity in liquid scintillation counting, said device including a liquid scintillation counter in a measurement chamber surrounded by radiation protective means, said scintillation counter measuring nuclear fissions occurring in a sample bottle moved into said measurement chamber along a predetermined path, said device comprising
   ionizing means for ionizing the air by producing positive and negative ions in said path followed by said sample bottle into said measurement chamber whereby ions produced by said ionizing means on said sample bottle before said bottle enters said chamber neutralize any electrostatic charge on said bottle.
2. A device as claimed in claim 1, wherein said ionizing means includes a metal tip at which said ions are produced.
3. A device as claimed in claim 2, wherein said ionizing means further includes an AC transformer having a primary winding electrically connected to a source of alternating electrical energy and a secondary winding electrically coupled to said metal tip.
4. A device as claimed in claim 3, wherein said ionizing means further includes a resistor electrically connected in series between said secondary winding and said tip.
5. A device as claimed in claim 3, wherein said transformer is a step up transformer.

* * * * *